UNITED STATES PATENT OFFICE.

THOMAS LEOPOLD WILLSON AND MAXIMILIAN MATTHEUS HAFF, OF OTTAWA, ONTARIO, CANADA, ASSIGNORS, BY DIRECT AND MESNE ASSIGNMENTS, TO SOUTHERN INVESTMENT CO. OF CANADA LTD., OF MONTREAL, CANADA, A CORPORATION OF CANADA.

FERTILIZER.

1,166,104.                Specification of Letters Patent.       Patented Dec. 28, 1915.

No Drawing.        Application filed October 1, 1912. Serial No. 723,309.

*To all whom it may concern:*

Be it known that we, THOMAS LEOPOLD WILLSON and MAXIMILIAN MATTHEUS HAFF, of the city of Ottawa, Province of Ontario, Dominion of Canada, have invented a certain new and useful Improved Fertilizer, of which the following is the specification.

This invention relates to an improved fertilizer and particularly to an improvement on the fertilizer described in our application, Serial Number 715,570, filed August 17th, 1912. In the aforesaid application we described a fertilizer containing ammonium monocalcium phosphate. At present it is impossible to mix ordinary superphosphates with any degree of safety with a fertilizing material such as chlorid of ammonium, nitrate of calcium or sodium, or chlorid of potassium. We have discovered that the new fertilizing material ammonium monocalcium phosphate may be mixed freely with such materials, due no doubt, to the fact that such ammonium monocalcium phosphate contains practically no free acid. The result of the mixture of the monocalcium phosphate with other fertilizers such as chlorid of ammonium, nitrate of calcium or sodium and chlorid of potassium is a fertilizer of considerable value.

What we claim as our invention is:

1. As a new article of manufacture, a substantially dry fertilizer composition containing monocalcium ammonium phosphate, a little ammonium phosphate containing no free acid and being mixed with a fertilizing material.

2. As a new fertilizer, a double superphosphate containing a substantial amount of combined ammonia and being mixed with a fertilizing material of a character which will react with free acid.

In witness whereof we have hereunto set our hands in the presence of two witnesses.

THOMAS LEOPOLD WILLSON.
           MAXIMILIAN MATTHEUS HAFF.

Witnesses:
   PEARLE M. GARRAU,
   M. MAHONEY.